United States Patent [19]
Nagano

[11] Patent Number: 5,325,735
[45] Date of Patent: Jul. 5, 1994

[54] BICYCLE SPEED CONTROL APPARATUS HAVING A SPEED INDICATOR

[75] Inventor: Masashi Nagano, Izumi, Japan

[73] Assignee: Shimano Inc., Osaka, Japan

[21] Appl. No.: 5,073

[22] Filed: Jan. 15, 1993

[30] Foreign Application Priority Data

Jan. 21, 1992 [JP]  Japan ............................ 4-001598[U]

[51] Int. Cl.⁵ .......................... F16C 1/10; G05G 11/00
[52] U.S. Cl. ...................................... 74/502.2; 74/475; 74/483
[58] Field of Search .......... 74/505, 475, 142, 501.5 R, 74/500.5, 502.2, 523, 477

[56] References Cited

U.S. PATENT DOCUMENTS

| | | |
|---|---|---|
| 3,331,259 | 7/1967 | Reimer .................... 74/475 |
| 3,499,346 | 3/1970 | Ishida et al. ............ 74/501.5 R |
| 3,633,437 | 1/1972 | Ishida ..................... 74/489 |
| 4,028,960 | 6/1977 | Hauser et al. ........... 74/477 |
| 4,038,883 | 8/1977 | Jones ...................... 74/475 X |
| 4,155,270 | 5/1979 | Juy ......................... 74/475 |
| 4,412,828 | 11/1983 | Darby .................... 74/475 X |
| 4,848,502 | 7/1989 | Kikuta et al. ........... 74/523 X |
| 5,095,768 | 3/1992 | Nagano .................. 74/502.2 X |
| 5,178,033 | 1/1993 | Kund ...................... 74/489 X |

FOREIGN PATENT DOCUMENTS

| | | | |
|---|---|---|---|
| 2817627 | 11/1978 | Fed. Rep. of Germany ........ 74/475 |
| 2387839 | 11/1978 | France ................................ 74/502.2 |
| 446958 | 3/1949 | Italy .................................... 74/489 |
| 48-18761 | 5/1973 | Japan ................................. 74/502.2 |
| 48-33173 | 10/1973 | Japan ................................. 74/502.2 |

Primary Examiner—Vinh T. Luong
Attorney, Agent, or Firm—Dickstein, Shapiro & Morin

[57] ABSTRACT

A speed control apparatus for controlling a change speed device of a bicycle and for displaying speed conditions produced by the change speed device. The speed control apparatus includes a shifting device, and a speed indicator for displaying the speed conditions produced by the change speed device. The shifting device includes a takeup reel rotatable about a first axis to wind a speed control cable, and a shift lever for rotating the takeup reel. The speed indicator includes an indicating element disposed above the takeup reel and at least partly overlapping the takeup reel in plan view. The indicating element is interlocked through engagement to the shifting device to be rotatable about a second axis intersecting the first axis.

8 Claims, 10 Drawing Sheets

BICYCLE SPEED CONTROL APPARATUS HAVING A SPEED INDICATOR

BACKGROUND OF THE INVENTION

1. Field of the Invention

The present invention relates to a speed control apparatus for controlling a change speed device of a bicycle, and particularly to a speed control apparatus adapted to display speed conditions produced by the change speed device. This speed control apparatus includes a shifting device, and a speed indicator for displaying speed conditions produced by the change speed device. The shifting device includes a takeup reel rotatable about a first axis to wind a speed control cable, and a shift lever for rotating the takeup reel. The shift lever is pivotable about the first axis or an axis extending parallel thereto.

2. Description of the Related Art

A conventional bicycle speed control apparatus is disclosed in Japanese Utility Model Publication No. 48-18761, for example. This apparatus includes a speed indicator having a dial plate and a pointer pivotable about a vertical axis. The speed indicator is disposed laterally of a takeup reel for winding a speed control cable. The pointer is interlocked to the takeup reel through a flexible shaft and a gear mechanism. The apparatus allows the cyclist to change bicycle speed while looking at the speed indicator to readily recognize speed conditions produced by a change speed device.

Such a conventional speed control apparatus has a relatively large overall construction because of the positional relationship between the speed indicator and takeup reel. Further, since the interlocking system between the speed indicator and takeup reel includes the flexible shaft for changing a direction of transmission, the conventional apparatus has the drawbacks not only that the interlocking system is large and complicated, but that the speed indicator has reduced precision and reliability.

SUMMARY OF THE INVENTION

The object of the present invention is to provide a compact speed control apparatus for a bicycle, with a high degree of speed indicating precision and reliability.

In order to fulfill the above object, the present invention provides an improvement on the type of speed control apparatus noted in the outset hereof, in which the speed indicator includes an indicating element disposed above the takeup reel and at least partly overlapping the takeup reel in plan view, the indicating element being interlocked through engagement to the shifting device to be rotatable about a second axis intersecting the first axis which is a rotational axis of the takeup reel.

With this speed control apparatus, when the shift lever is operated to rotate the takeup reel, the speed control cable is pulled or relaxed to switch the change speed device. At the same time, the indicating element interlocked through engagement to the takeup reel or the shift lever is rotated, with a relatively high degree of precision, through an angle corresponding to an angle of rotation of the takeup reel. Thus, the speed indicator accurately indicates a speed condition newly produced by the change speed device.

To facilitate the lever operation, the speed control apparatus may be attached to a bicycle frame or a handlebar in a way that the shift lever is pivotable about a horizontal axis such as an axis extending transversely of the bicycle frame. With such assembly to the bicycle frame, the speed indicator has a display plane facing upward as a whole to facilitate observation since the indicating element is rotatable about the axis intersecting the rotational axis of the takeup reel. Furthermore, with the indicating element disposed in an at least partly overlapping positional relationship to the takeup reel, the speed indicator and takeup reel are arranged close to each other. Consequently, the speed control apparatus has a compact overall construction.

The cyclist can easily and correctly recognize the speed conditions produced by the change speed device since the indicating element indicates the speed conditions with high precision and since the entire displaying plane is easy to observe. This allows the cyclist to carry out a desired shifting operation easily and quickly.

Since this speed control apparatus has a compact overall construction, the apparatus may be installed in a relatively small space.

Other features and advantages of the present invention will be apparent from the following description of the preferred embodiment taken with reference to the drawings.

BRIEF DESCRIPTION OF THE DRAWINGS

The drawings show a speed control apparatus according to the present invention, in which.

DETAILED DESCRIPTION OF THE PREFERRED EMBODIMENT

Figure 1:
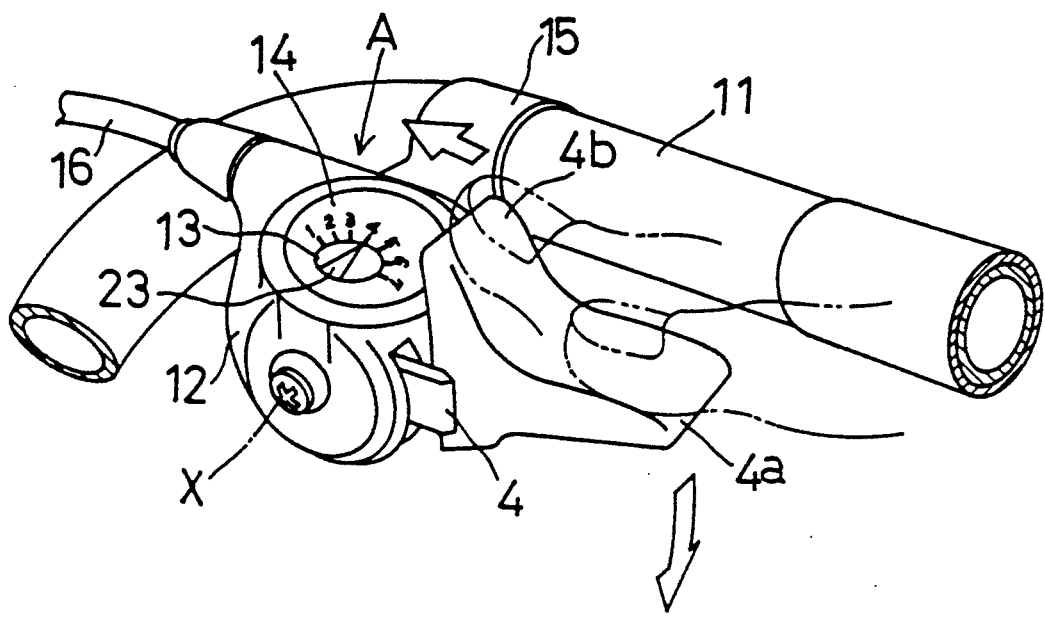
FIG. 1 is a perspective overall view of the speed control apparatus.
Figure 2:
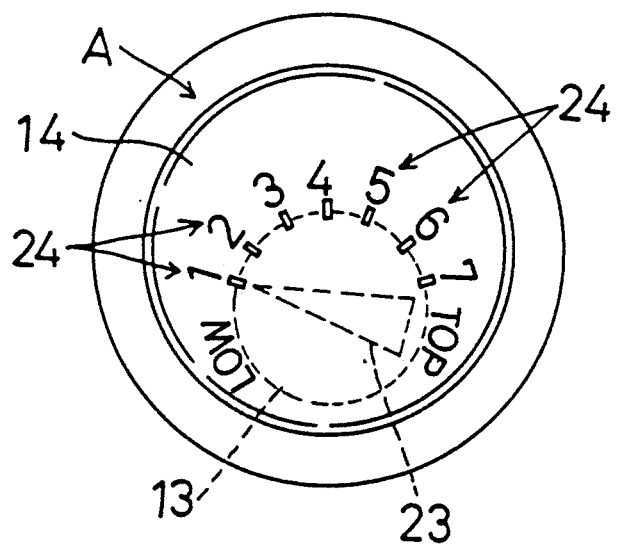
FIG. 2 is a plan view of a speed indicator.

FIG. 1 shows a perspective view of a speed control apparatus according to the present invention attached to a right side portion of a handlebar 11 of a bicycle. This apparatus has a shift lever 4 pivotable about a substantially horizontal axis X (first axis) to cause a change speed device to produce a desired speed. FIG. 2 shows a plan view of a speed indicator A for displaying a speed produced by the change speed apparatus.

Figure 3:
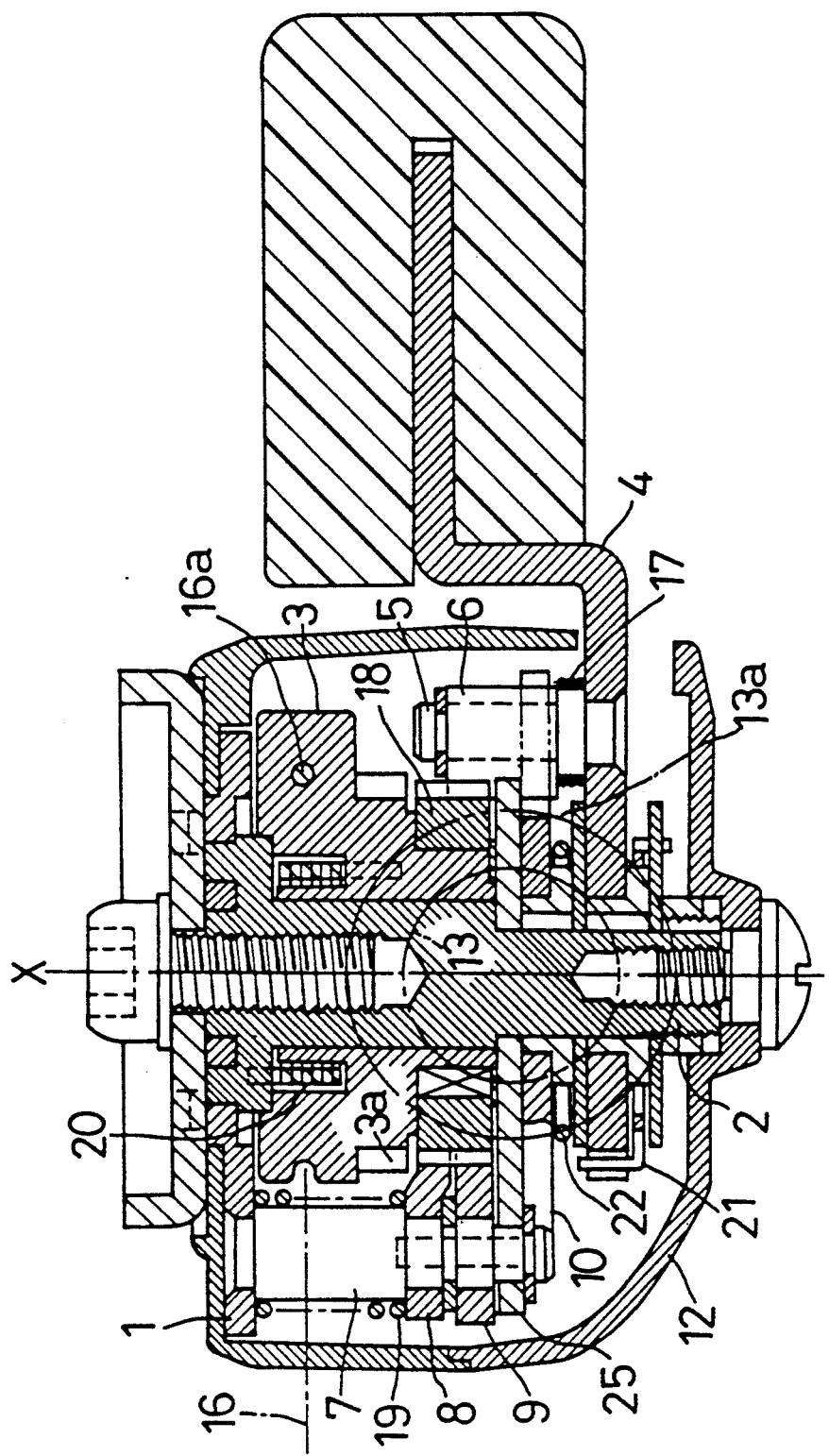
FIG. 3 is a sectional view of the speed control apparatus.
Figure 4:
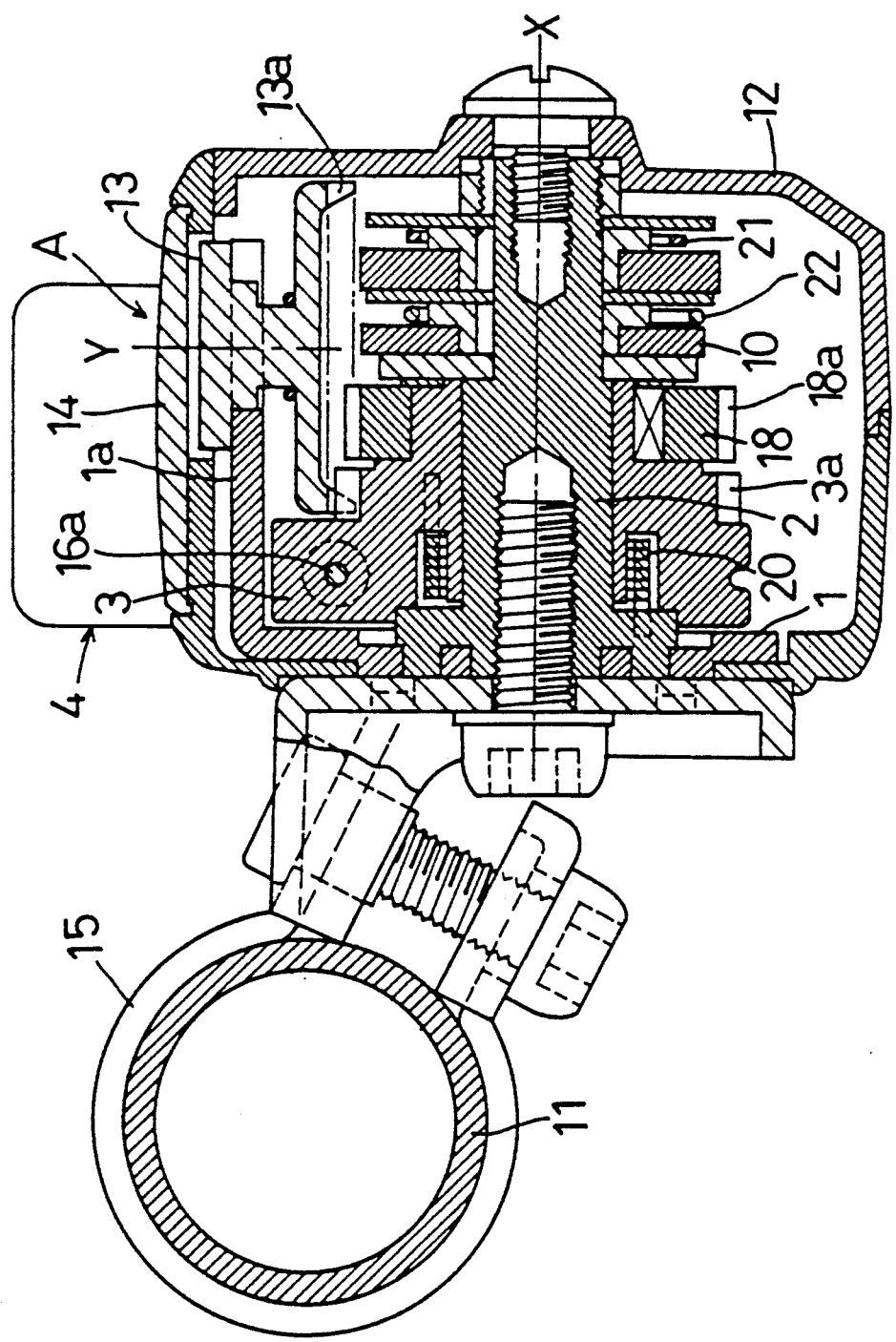
FIG. 4 is a front view in vertical section of the speed control apparatus.
Figure 5:
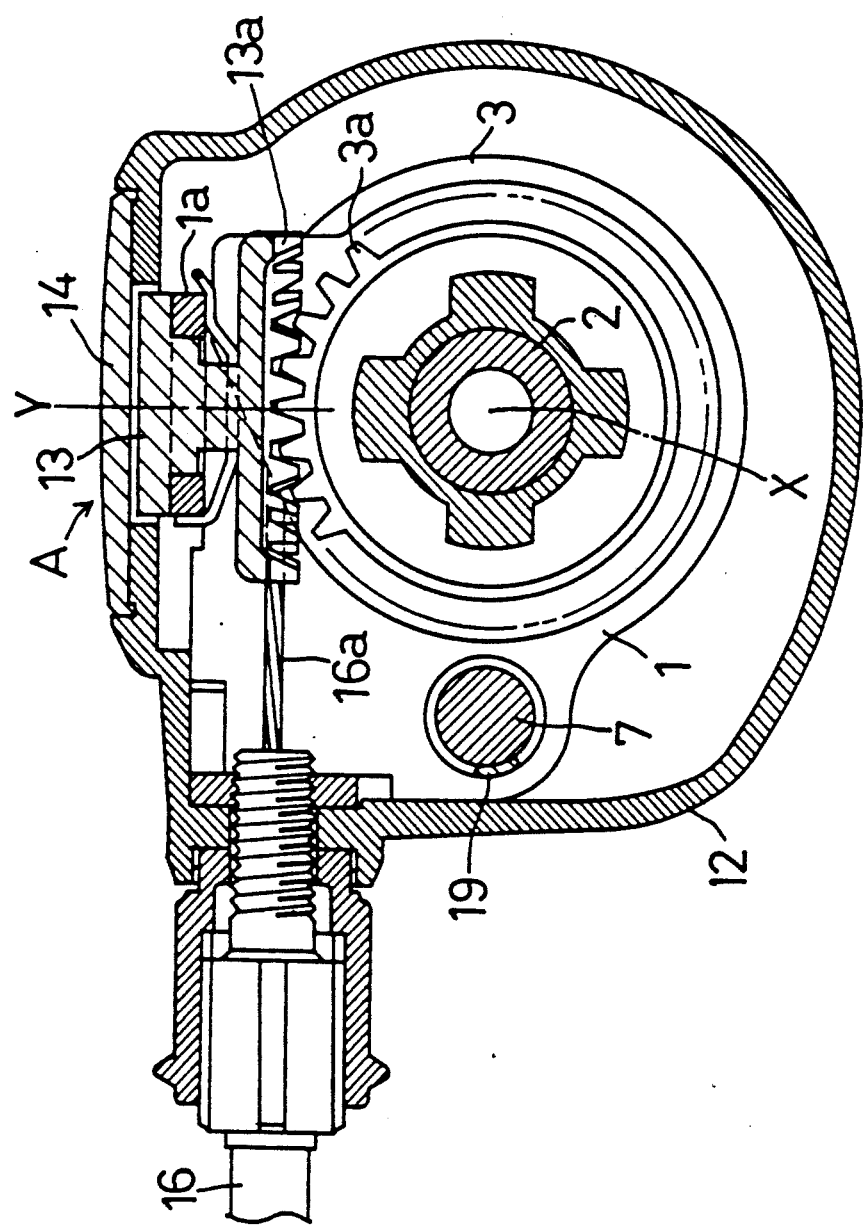
FIG. 5 is a sectional view of the speed indicator.

Referring to FIGS. 3 and 4, a base element 1 has a support shaft 2 rotatably supporting a takeup reel 3 thereon. The shift lever 4 is attached to the support shaft 2 to be pivotable about the axis X which substantially is also an axis of rotation of the takeup reel 3. The shift lever 4 has a feed pawl 6, as shown in FIG. 9, pivotally attached thereto through a feed pawl axis 5.

Figure 9:
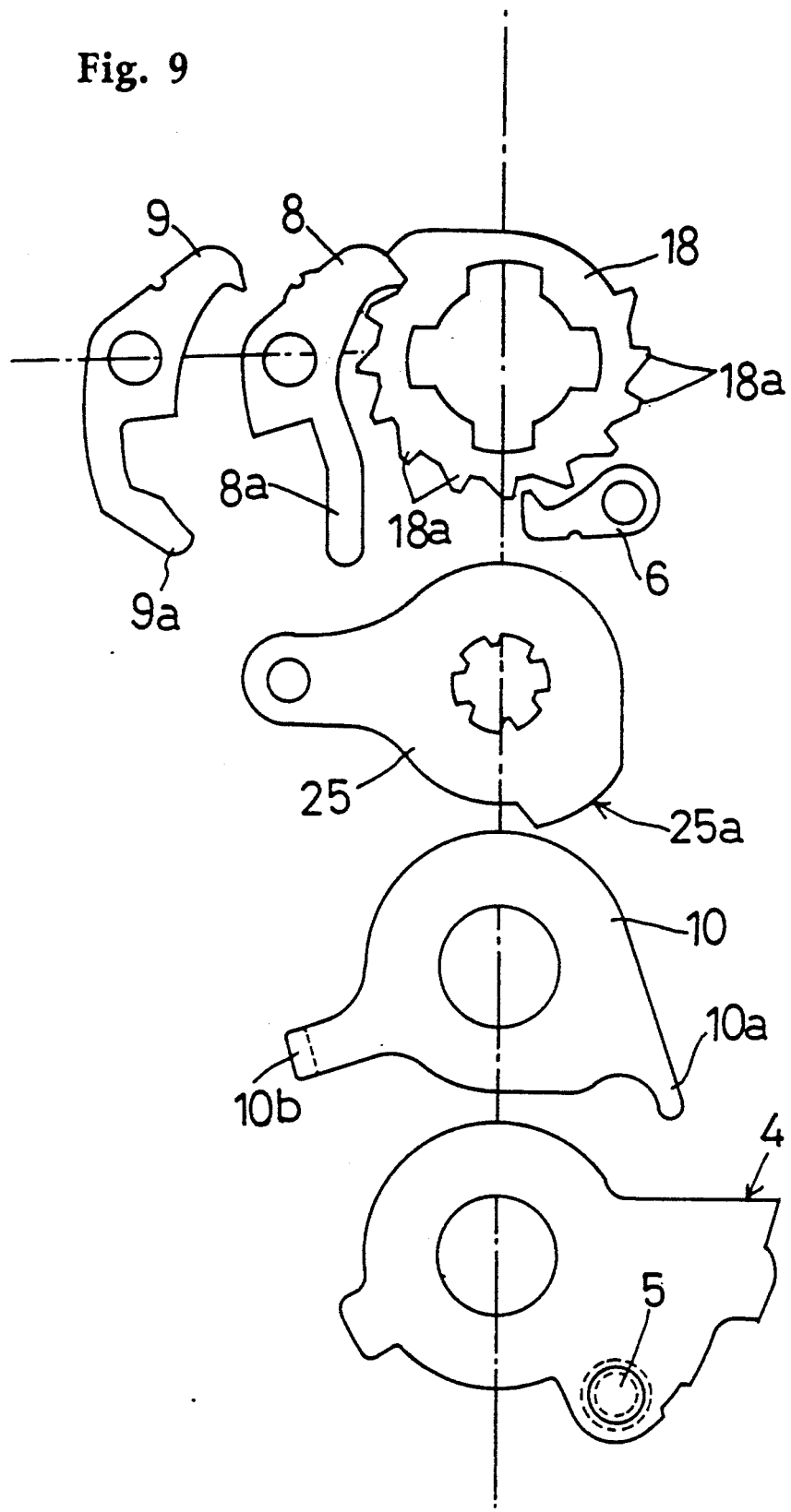
FIG. 9 is a side view of components of the speed control apparatus.

The base element 1 has a first positioning pawl 8 and a second positioning pawl 9, as shown in FIG. 9, pivotally attached thereto through a pawl axis 7. The support shaft 2 further supports a release element 10 and a guide element 25. With this construction, the shift lever 4 is operable to rotate the takeup reel 3.

The takeup reel 3, positioning pawls 8 and 9, and a proximal portion of the shift lever 4 are enclosed in a cover 12. As shown in FIG. 1, the speed indicator A including an indicating element 13 and a dial 14 is mounted above the takeup reel 3. The speed control apparatus is attached to the handlebar 11 by a clamping band 15, with the pivotal axis X of the shift lever 4 extending substantially horizontally. An inner wire 16a of a speed control cable 16 is connected to the takeup reel 3 to control a varied type of change speed device such as a derailleur or a device contained in a rear hub. The takeup reel 3 is rotatable by operating the shift lever 4, to pull or relax the speed control cable 16, thereby to switch the change speed device. A speed condition produced by the change speed device is seen from the speed indicator A. This mechanism will particularly be described hereunder.

Figure 6:
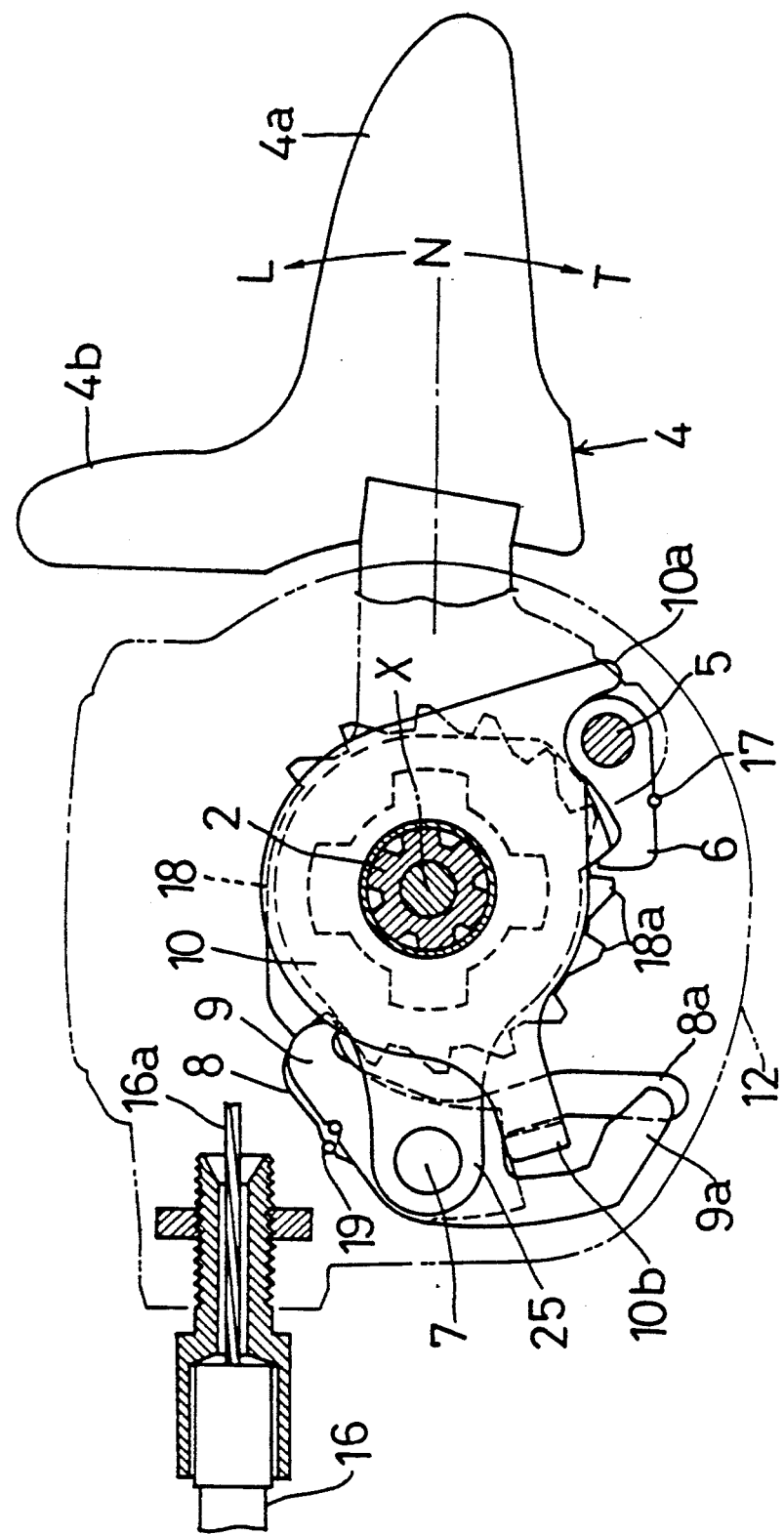
FIG. 6 is a schematic side view of the speed control apparatus in an inoperative position.

The shift lever 4 includes a first control portion 4a and a second control portion 4b. When the cyclist presses the first control portion 4a, the shift lever 4 pivots about the axis X downward from a standby position n as shown in FIG. 6. When the cyclist presses the second control portion 4b, the shift lever 4 pivots about the axis X upward from the standby position N.

Figure 7:
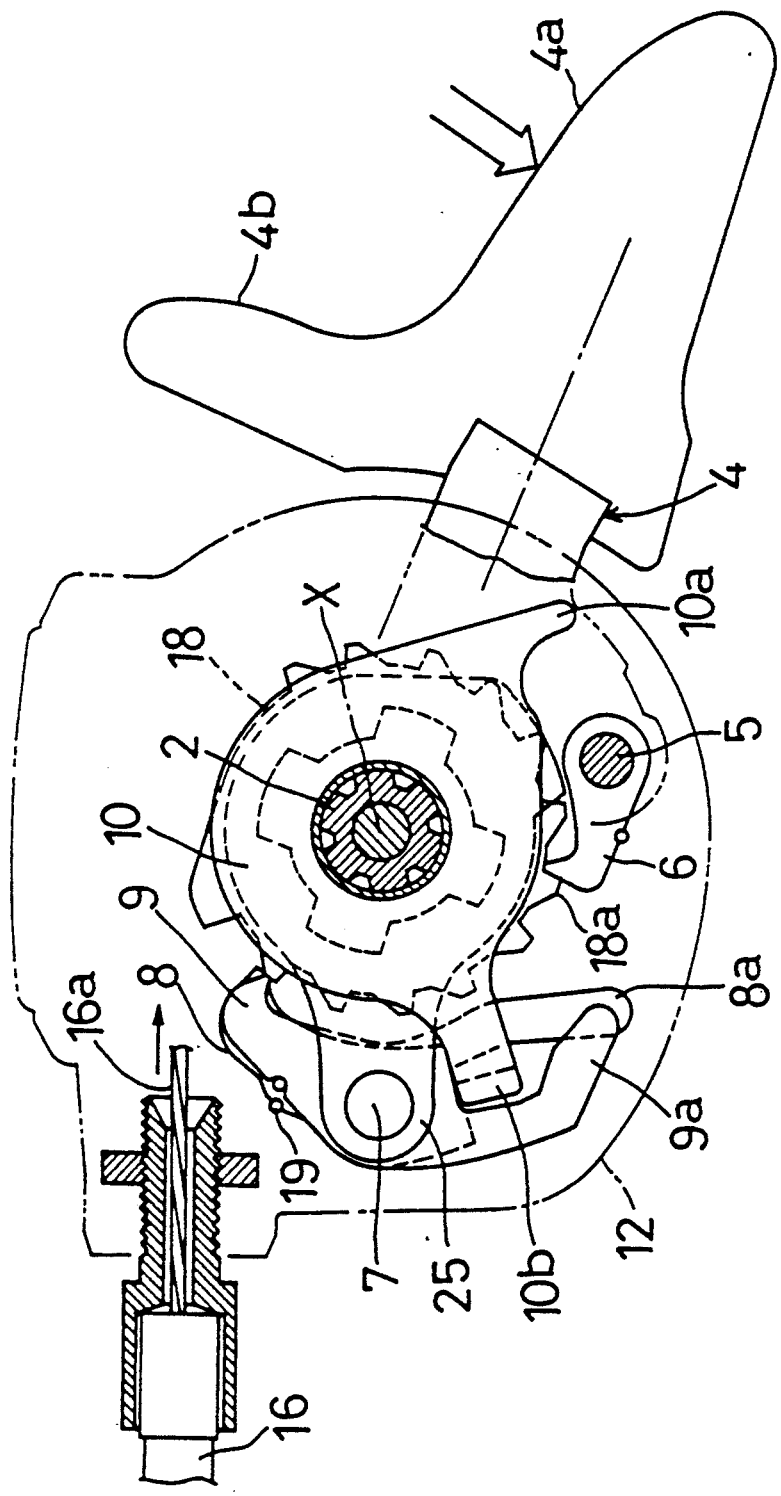
FIG. 7 is a schematic side view of the speed control apparatus in a cable winding position.

When the shift lever 4 is moved from the standby position N in a downward direction T as shown in FIG. 7, the takeup reel 3 is rotatable since the feed pawl 6, under the biasing force of a feed pawl spring 17, is engaged with one of ratchet teeth 18a of a positioning element 18 and the positioning element 18 is engaged with a boss of the takeup reel 3. The feed pawl and positioning element constitute an interlock mechanism. Further, the ratchet teeth 18a are shaped to push the first positioning pawl 8 and second positioning pawl 9 out of engagement therewith to allow rotation of the takeup reel 3. With the above construction, the takeup reel 3 is rotated to wind the inner wire 16a, by an operating force transmitted from the shift lever 4 through the feed pawl 6 and positioning element 18. When the shift lever 4 pivots through a predetermined angle, the takeup reel 3 rotates a corresponding amount to make a predetermined wire winding stroke. This switches the change speed device to a target high speed position. Then, the first positioning pawl 8, under the biasing force of a pawl spring 19, automatically returns to a position to engage one of the ratchet teeth 18a, thereby to act a a stopper on the takeup reel 3.

Thus, even when the cyclist releases the shift lever 4, the takeup reel 3 remains in the position to which it has been rotated, despite the biasing force of an unwind spring 20 acting on the takeup reel 3 and a wire pulling force due to a self-restoring force of the change speed device. Consequently, the change speed device is maintained in the high speed position.

The shift lever 4, when released, automatically returns to the standby position N under the biasing force of a return spring 21.

Figure 8:
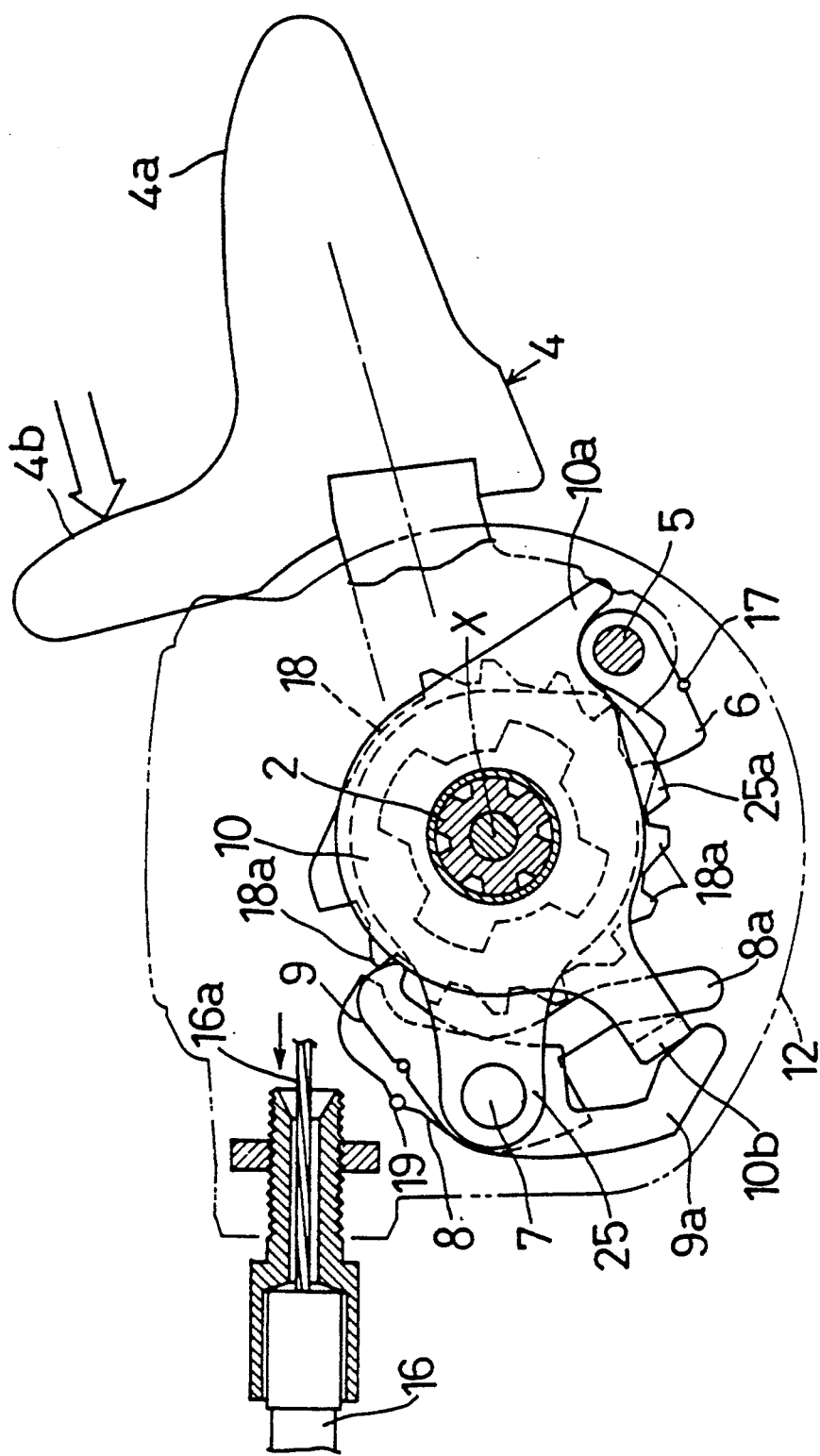
FIG. 8 is a schematic side view of the speed control apparatus in a cable unwinding position.
Figure 10:
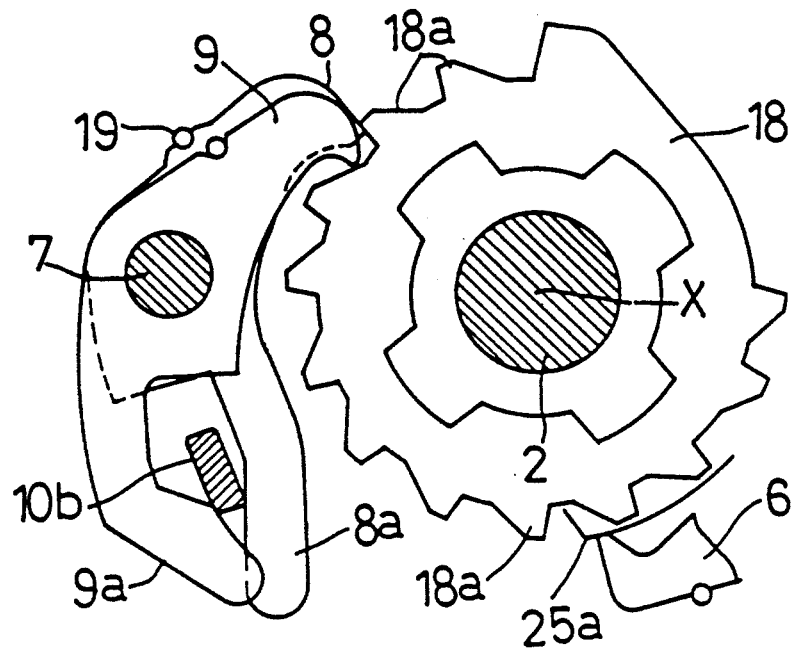
FIG. 10 is a side view showing an operative position of positioning pawls.
Figure 11:
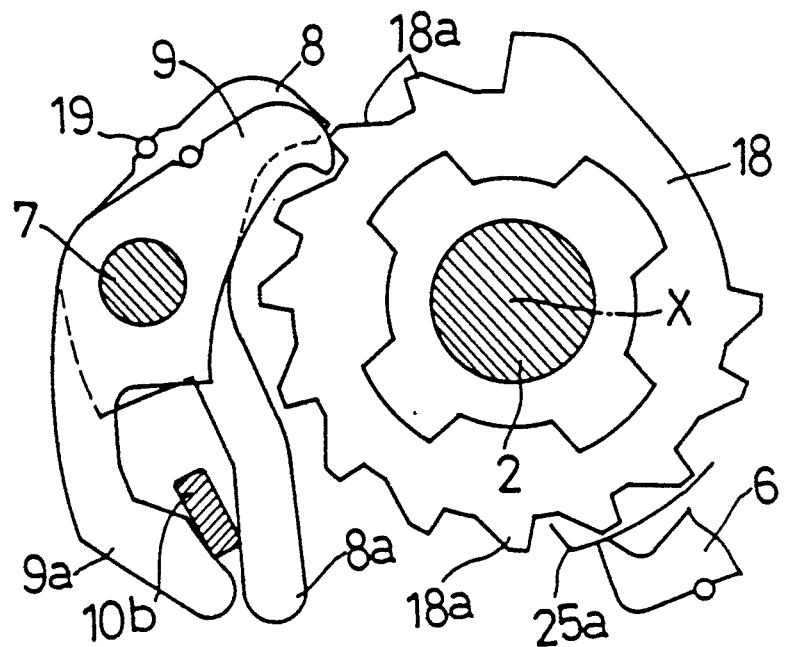
FIG. 11 is a side view showing a different operative position of the positioning pawls.
Figure 12:
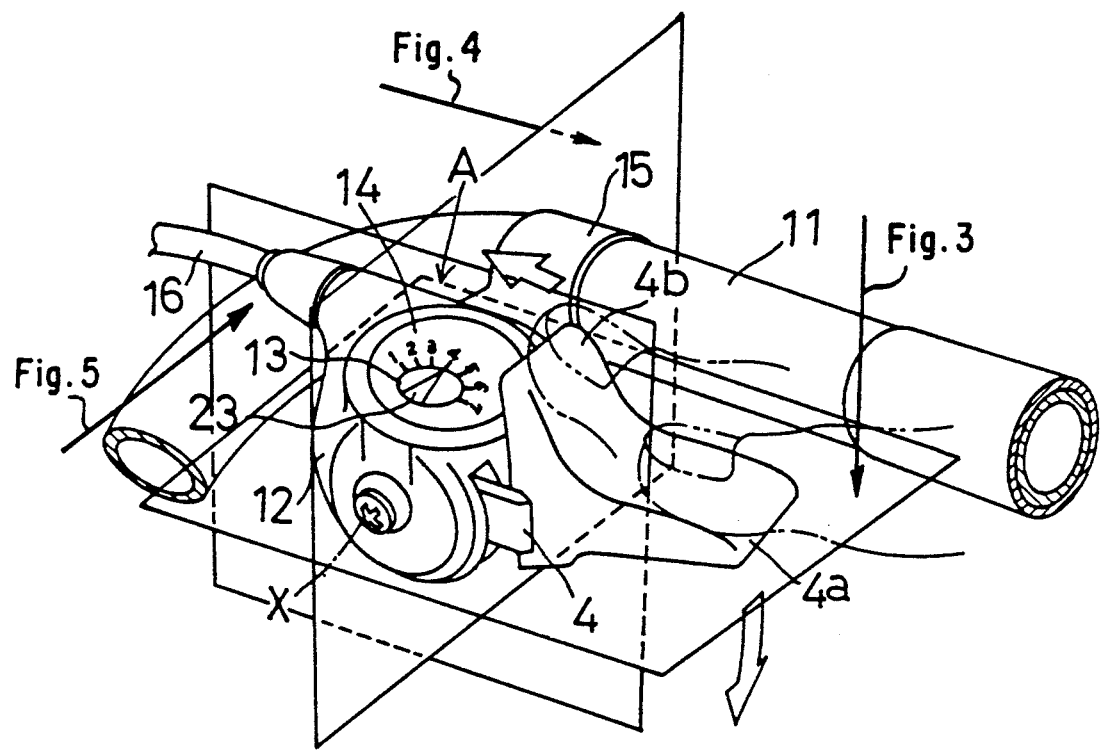
FIG. 12 is a view like FIG. 1 showing the planes upon which sectional views are taken.

When the shift lever 4 is moved from the standby position N in an upper direction L as shown in FIG. 8, the feed pawl 6 rides on a guide portion 25a of the guide element 25 to retract from the ratchet teeth 18a, thereby allowing the takeup reel 3 to rotate in the wire unwinding direction. At this time, a proximal portion of the feed pawl 6 contacts a first arm 10a of the release element 10. The operating force transmitted from the shift lever 4 through the pawl axis 5 and feed pawl 6 causes the release element 10 to rotate in the direction of pivotal movement of the shift lever 4. As a result, a second arm 10b of the release element 10 moves to a position between an arm 8a of the first positioning pawl 8 and an arm 9a of the second positioning pawl 9. As shown in FIG. 10, the second arm 10b pushes the arm 9a whereby the second positioning pawl 9 pivots to place a tip end thereof between an adjacent pair of ratchet teeth 18a. At this time, a tip end of the first positioning pawl 8 contacts one of the ratchet teeth 18a to stop rotation of the takeup reel 3. When the shift lever 4 pivots further in the upward direction L to a predetermined position, the second arm 10b pushes the arm 8a whereby the tip end of the first positioning pawl 8 is retracted from the ratchet teeth 18a. Then, the takeup reel 3 slightly rotates in the unwinding direction under the biasing force of unwind spring 20 and the wire pulling action of the change speed device. As this time, as shown in FIG. 11, the ratchet tooth 18a having disengaged from the first positioning pawl 8 contacts the tip end of the second positioning pawl 9. The second positioning pawl 9 now prevents the takeup reel 3 from rotating an excessive amount in the unwinding direction. When the cyclist releases the shift lever 4, the release element 10, under the biasing force of a return spring 22, returns to the standby position shown in FIG. 6. The shift lever 4 also automatically returns to the standby position N under the biasing force of return spring 22 acting through the release element 10. As the release element 10 returns to the standby position, the second arm 10b stops pushing the arm 9b. Consequently, and because of the shape of the tip end, the second positioning pawl 9 is pushed by the ratchet teeth 18a out of engagement therewith, with rotation of the takeup reel 3. The takeup reel 3 rotating in the unwinding direction makes a predetermined unwinding stroke, whereby the change speed device is switched to a one-stage lower speed. At this time, the tip end of the first positioning pawl 8, under the biasing force of the pawl spring 19, enters between the ratchet tooth 18a having disengaged from the first positioning pawl 8 and the next ratchet tooth 18a, and contacts the latter. As a result, the takeup reel 3 stops rotating, thereby to maintain the change speed device in the new speed position. This completes the change speed operation.

As shown in FIG. 1, the speed indicator A has the indicating elements 13 rotatable inside the cover 12 as a result of a change speed operation. The indicating elements 13 includes a pointer 23 printed on an upper surface thereof. The dial 14 is provided on an upper surface of the cover 12 and includes a plurality of signs 24 as shown in FIG. 2. The pointer 23 points to one of the signs 24 corresponding to the speed produced by the change speed device. Details of this mechanism are illustrated in FIGS. 3 through The indicating element 13 is disposed above the takeup reel 3, with a portion of the indicating element 13 close to the base element 1 overlaps part of the takeup reel 3 in plan view. The indicating element 13 is attached to a support arm 1a of the base element 1 to be rotatable about an axis Y (second axis) perpendicular to the axis X of rotation of the takeup reel 3.

The indicating element 13 includes a crown gear 13a formed simultaneously when the indicating element 13 is formed. The crown gear 13a is meshed with a spur gear 3a formed on the takeup reel 3. Thus, the indicating element 13 is interlocked to the takeup reel 3, so that the indicating element 13 is rotatable, with high precision, through an appropriate angle in a direction corresponding to a shifting direction of a change speed operation. The indicating element 13 and takeup reel 3 may be interlocked in any ratio, but in the preferred embodiment;

the number of teeth of the spur gear 3a of the takeup reel 3 is 30, and the number of teeth of the crown gear 13a of the indicating element 13 is 26.

That is, the indicating element 13 is rotatable through a larger angle than the takeup reel 3. Drive is transmitted in acceleration from the takeup reel to the indicating element 13, thereby allowing maximal intervals between the signs 24 on the dial 14.

The dial 14 is mounted on a pointer viewing window formed in a position of the cover 12 opposed to the indicating element 13. The dial 14 is formed of a transparent lens to facilitate observation of the pointer 23.

The entire indicating element 13 may overlap the takeup reel 3 in plan view, with the spur gear 3a formed in a position of the takeup reel 3 between a wire winding portion thereof and the base element 1.

The pointer may be provided on the cover or other stationary member, with the dial including the signs interlocked to the takeup reel. The movable element is called indicating element 13 herein, The speed indicator may have a display plane slightly inclined leftward, rightward, forward or backward. In this case, the rotational axis of the indicating element is slightly inclined relative to the rotational axis of the takeup reel. Thus, the rotational axis Y of the indicating element extends in a direction to intersect the rotational axis X of the takeup reel.

The signs indicated by the pointer may be numerals, characters or pictures.

In the described embodiment, the shift lever is the auto return type that rotates the takeup reel through the feed pawl, and thereafter returns to the standby position. This type of lever may be adapted pivotable about an axis separate from the rotational axis of the takeup reel.

It is in accordance with the present invention to provide a non-return type shift lever which is pivotable in rigid connection to the takeup reel. The shift lever and takeup reel may self-hold in each control position such as by friction. Where the shift lever is the non-return type, the indicating device may be interlocked to either the takeup reel or the shift lever.

The indicating element may be interlocked to the takeup reel or the shift lever through gearing as in the described embodiment. Alternatively, one of the indicating element and the takeup reel or shift lever may include an interlocking projection, with the other including a rotatable portion having a recess for receiving the projection. These interlocking devices are collectively called herein an interlock through engagement.

What is claimed is:

1. A speed control apparatus for controlling a change speed device of a bicycle, comprising:

shift means including a takeup reel which rotates about a first axis and is adapted to wind a speed control cable, and a shift lever pivoted about said first axis to rotate said takeup reel; and indicator means for displaying a speed condition, said indicator means including an indicator element disposed above said takeup reel and at least partly overlapping said takeup reel in plan view, said indicating element being interlocked through engagement with said shift means to rotate about a second axis intersecting said first axis.

2. A speed control apparatus as defined in claim 1, wherein said first axis and said second axis intersect each other substantially at right angles.

3. A speed control apparatus as defined in claim 1, wherein said indicating element is interlocked through engagement to said takeup reel.

4. A speed control apparatus as defined in claim 3, wherein said takeup reel defines a drive gear, and said indicating element defines driven gear meshed with said drive gear.

5. A speed control apparatus as defined in claim 4, wherein said drive gear has a greater number of teeth than said driven gear.

6. A speed control apparatus as defined in claim 3, wherein said shift lever is pivoted about said first axis and interlocked to said takeup reel through an engaging interlock mechanism, said takeup reel and said engaging interlock mechanism being arranged to overlap said indicating element.

7. A speed control apparatus for controlling a change speed device of a bicycle, comprising:

shift means including a takeup reel which rotates about a first axis and is adapted to wind a speed control cable, and a shift lever pivoted about said first axis to rotate said takeup reel; and indicator means for displaying a speed condition, said indicator means including an indicator element disposed above said takeup reel and at least partly overlapping said takeup reel in plan view, said indicating element being interlocked through engagement with said shift means to rotate about a second axis intersecting said first axis;

wherein said indicating element is interlocked through engagement to said takeup reel, said shift lever is pivoted about said first axis and interlocked to said takeup reel through an engaging interlock mechanism, and said takeup reel and said engaging interlock mechanism are arranged to overlap said indicating element.

8. A speed control apparatus as defined in claim 7, wherein said engaging interlock mechanism includes a feed pawl and a positioning element.

* * * * *